United States Patent [19]

Tsutsui et al.

[11] Patent Number: 6,100,917
[45] Date of Patent: *Aug. 8, 2000

[54] BIDIRECTIONAL CABLE TELEVISION SYSTEM, CABLE TELEVISION DISTRIBUTING DEVICE AND PROCESSING TERMINAL DEVICE

[75] Inventors: Seiji Tsutsui; Shigeru Oizumi; Tomoyoshi Suzuki, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/655,385

[22] Filed: May 30, 1996

[30] Foreign Application Priority Data

Jun. 30, 1995 [JP] Japan .................................. 7-164386

[51] Int. Cl.⁷ .............................. H04N 7/14; H04H 1/00
[52] U.S. Cl. ............................. 348/13; 348/12; 455/3.1; 455/4.2; 455/5.1
[58] Field of Search .................... 348/7, 12, 13; 455/3.1, 4.1–4.2, 5.1, 6.1–6.3; 463/40, 42; 345/327; 395/828, 830

[56] References Cited

U.S. PATENT DOCUMENTS

| | | | |
|---|---|---|---|
| 4,592,546 | 6/1986 | Fascenda et al. | 273/1 |
| 5,524,195 | 6/1996 | Clanton, III et al. | 348/12 |
| 5,585,838 | 12/1996 | Lawler et al. | 455/5.1 |
| 5,592,212 | 1/1997 | Handelman | 348/12 |
| 5,630,757 | 5/1997 | Gagin et al. | 348/13 |
| 5,636,209 | 6/1997 | Perlman | 370/281 |
| 5,643,088 | 7/1997 | Vaughn et al. | 463/40 |
| 5,668,950 | 9/1997 | Kikuchi et al. | 455/5.1 |
| 5,721,951 | 2/1998 | DorEl | 395/830 |
| 5,724,091 | 3/1998 | Freeman et al. | 348/13 |
| 5,752,080 | 5/1998 | Ryan | 395/828 |

FOREIGN PATENT DOCUMENTS

| | | |
|---|---|---|
| 4-84589 | 3/1992 | Japan . |
| 6-188847 | 7/1994 | Japan . |
| 6-217271 | 8/1994 | Japan . |

*Primary Examiner*—Vu Le
*Attorney, Agent, or Firm*—Staas & Halsey LLP

[57] ABSTRACT

A bidirectional CATV system having a CATV distributing device and a terminal system. The CATV distributing device includes a video information generating unit that generates video information by executing software, particularly game software, using execution information and a communication unit then receives the execution information from the terminal system. The communication unit sends the execution information to the video information generating unit and transmits the video information generated by the video information generating unit to the terminal system. The terminal system incudes a TV receiver that displays the video information transmitted from the CATV distributing device and a processing device having an execution information compilation unit that compiles the execution information. The communication unit then transmits the execution information to the CATV distributing device.

7 Claims, 12 Drawing Sheets

BIDIRECTIONAL CABLE TELEVISION SYSTEM, CABLE TELEVISION DISTRIBUTING DEVICE AND PROCESSING TERMINAL DEVICE

BACKGROUND OF THE INVENTION

1. Field of the Invention

The present invention relates to a bidirectional cable television system, cable television distributing device and processing terminal device.

2. Description of the Related Art

A cable television (CATV: community antenna television, cable television) system is constitutes of subscriber-side television (TV) receivers, a cable television (CATV) distributing device on the CATV center side, and a wide-bandwidth transmission path connecting the subscriber side and the CATV center side. A CATV distributing device provides to the subscriber-side TV receiver multi-channel video information sources from groundwave, satellite broadcasts and communication satellite broadcasts, etc. The wide bandwidth transmission path is a coaxial cable or optical fiber etc.

However, a conventional CATV system could not perform complicated bidirectional information exchange in response to added information of many types from the subscriber side, such as when changing video information. Furthermore, a conventional CATV system was incapable of complicated bidirectional information exchange in response to added information from a plurality of subscribers, as such generating video information whereby such items of added information are mutually linked.

SUMMARY OF THE INVENTION

A first object of the present invention is to provide a bidirectional CATV system wherein multiple types of added information can be bidirectionally transmitted between a processing device on the subscriber side and the CATV distributing device, and wherein video information is generated in response to this added information and this generated video information can be transmitted to the subscriber side, thereby enabling complicated bidirectional information exchange.

Furthermore, a second object of the present invention is to provide a CATV distributing device wherein multiple types of added information can be received from the subscriber-side processing device and video information generated in response to this received added information, and this generated video information can be transmitted to the subscriber-side TV receiver, thereby enabling complicated bidirectional information exchange.

Further, a third object of the present invention is to provide a processing device whereby added information for generating video information can be transmitted to the CATV distributing device.

In order to achieve the first object, this bidirectional CATV system according to the present invention i's equipped with a CATV distributing device that transmits video information obtained by executing software, a TV receiver that displays video information transmitted from the CATV distributing device, and a processing device that transmits added information to the CATV distributing device.

The processing device is provided with an execution information compiling unit that compiles execution information used for the execution of the software by the CATV distributing device, and a communication unit that transmits the execution information as the added information.

The CATV distributing device is provided with a video information generating unit that generates the video information by executing the software using the execution information; and a communication unit that receives the added information and, if the added information that is received is the execution information, transfers the execution information to the video information generating unit and further transmits the video information generated by the video information generator unit to the TV receiver.

Also, in order to achieve the second object,this CATV distributing device, which is connected to a terminal system having a TV receiver that displays video information, and a processing device that sends execution information to the CATV distributing device, comprising: a video information generating unit that generates the video information by executing software using the execution information; and a communication unit that receives the execution information from the terminal system, and sends the execution information to the video information generating unit, and transmits the video information generated by the video information unit to the terminal system.

Furthermore, in order to achieve the third object,this processing device, which is connected to a CATV distributing device that sends video information obtained by executing software to a plurality of TV receivers, comprising: an execution information compilation unit that compiles execution information used in execution of the software to generate the video information in the CATV distributing device; and a communication unit that sends the execution information to the CATV distributing device.

With a bidirectional CATV system according to the present invention, the CATV distributing device can generate video information in response to multiple type of added information from the subscriber side and can communicate this to the subscriber's TV receiver. Consequently, the breadth of the service that can be provided by the CATV distributing device is extended.

Other objects and advantages of the present invention will become apparent during the following discussion in conjunction with the accompanying drawings, in which:

DETAILED DESCRIPTION OF THE PREFERRED EMBODIMENTS

Figure 1:
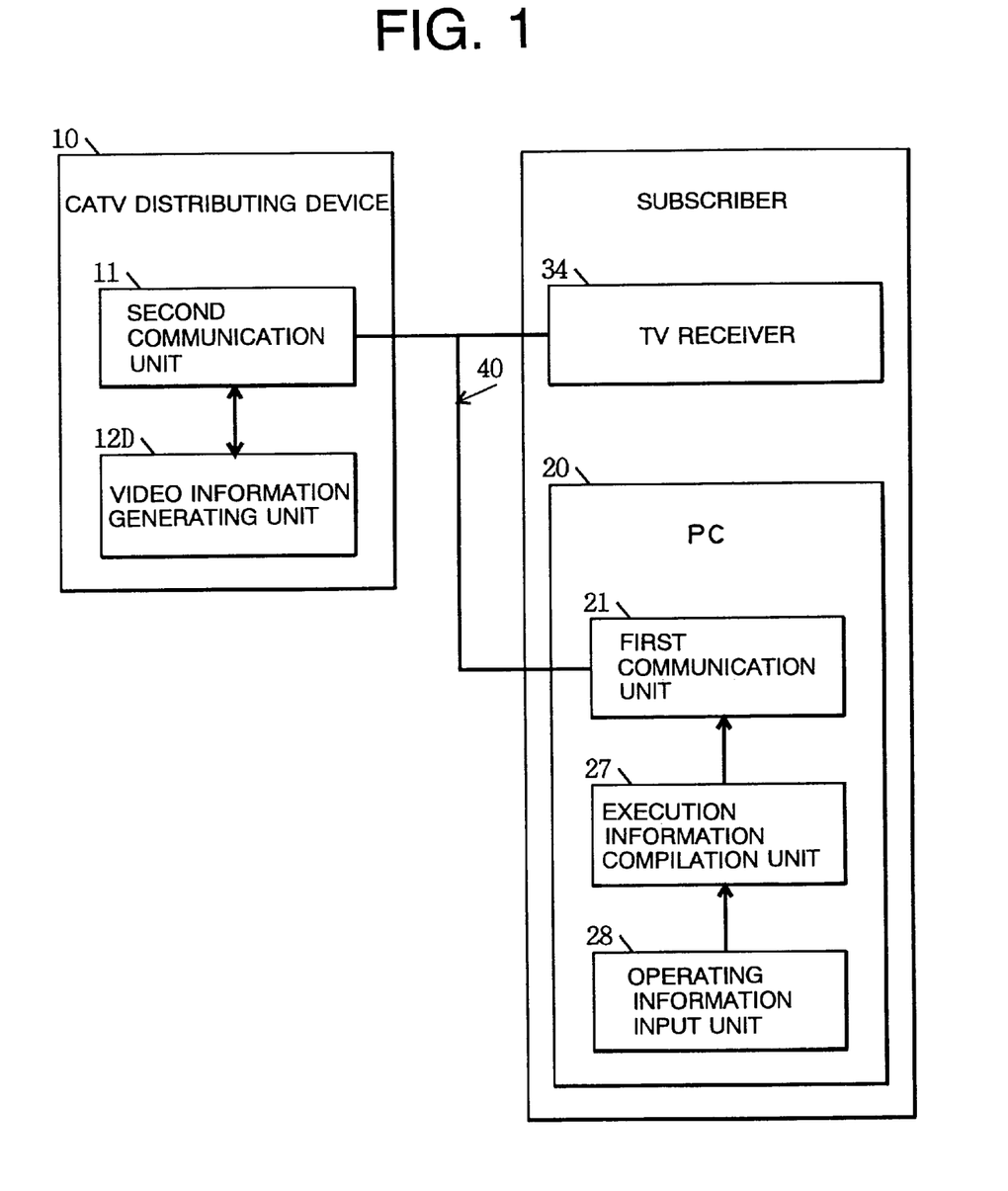
FIG. 1 is a block diagram of a bidirectional CATV system layout according to a first embodiment of the present invention.

Embodiments of the present invention are described below with reference to the drawings.
First embodiment FIG. 1 is a block diagram of the layout of a bidirectional cable television (CATV) system according to a first embodiment of the present invention.

The bidirectional CATV system is equipped with: a cable television (CATV) allotter device 10 that transmits video information and that receives added information, TV receivers 34 that display video information, and processing terminal devices (PC) 20 that transmit added information to CATV distributing device 10.

CATV distributing device 10 is provided with a video information generating unit 12D and second communications unit 11. Video information generating unit 12D holds prescribed software and generates video information by executing this software. For example, let it be assumed that video information generating unit 12D holds software whereby a racing car runs round a circuit. Thus, by executing this software, video information generating unit 12D generates video information whereby the racing car runs around the circuit. Also, when execution information (e.g. position information, direction information and speed information) that is used in the execution of this software is supplied from PC 20 to video information generating unit 12D, video information generating unit 12D changes the execution condition of the software in response to this execution information, and thereby changes the video information. Second communication unit 11 transmits the video information generated by video information generating unit 12D to TV receiver 34.

Also, second communication unit 11 receives added information from PC 20. If the added information that it receives is execution information, the second communication unit 11 sends this execution information to video information generating unit 12D.

PC 20 is a personal computer. This PC 20 is provided with an execution information compilation unit 27, a first communication unit 21, and an operating information input unit 28.

40 is an optical fiber cable (optical cable). Optical cable 40 is connected to PC 20 and CATV distributing device 10. The subscriber inputs operating information to execution information compilation unit 27 using operating information input unit 28. Execution information compilation unit 27 uses this operating information to generate signals (execution information) that are employed in execution of the software accommodated in video information generating unit 12D.

First communication unit 21 of PC 20 sends execution information compiled by execution information compilation unit 27 through a digital control channel allocated in the CATV broadcast band; this execution information constitutes the added information. Also, second communication unit 11 of CATV distributing device 10 receives added information through the control channel.

However, the video information is sent through an analogue video information channel. It should be noted that the information quantity of the added information is a lot smaller than the information quantity of the video information. The bandwidth of the control channel can therefore be a lot narrower than the bandwidth of the video information channel.

Figure 2:
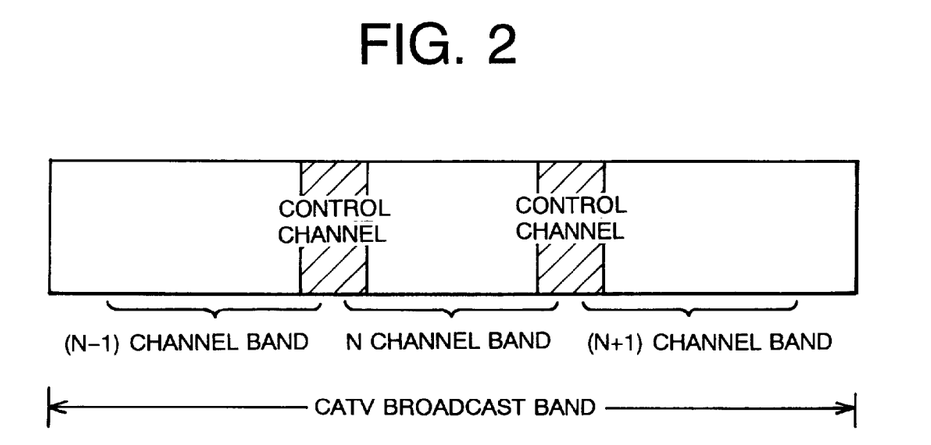
FIG. 2 is a diagram of a first system whereby control channels are allocated in the CATV transmission region.
Figure 3:
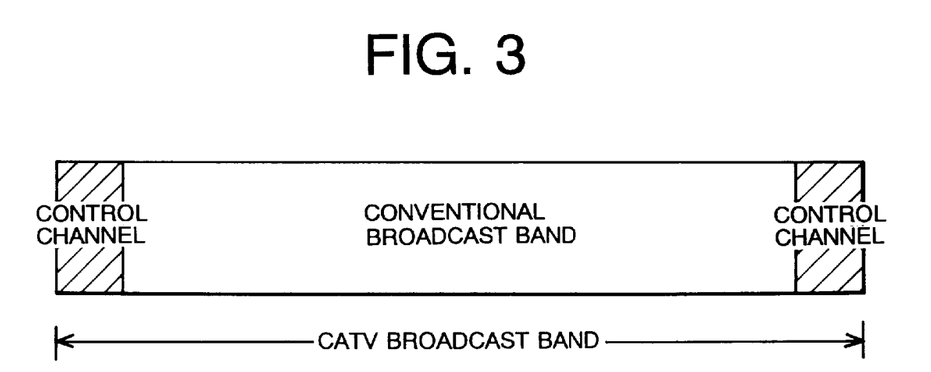
FIG. 3 is a diagram of a second system whereby control channels are allocated in a CATV transmission region.

FIG. 2 is an explanatory diagram of a first system of allocating control channels in the CATV broadcast band. FIG. 3 is an explanatory diagram of a second system for allocating control channels in the CATV broadcast band.

In the first system, the control channels are allocated between adjacent channel bands. In other words, the control channels are allocated in bands between the (N−1) channel band and the N channel band, or between the N channel band and the (N+1). channel band.

In the second system, the control channels are allocated in bands located at the top and at the bottom of the CATV broadcast band.

Also, CATV distributing device 10 transmits video information through a predetermined prescribed video channel. Specifically, when the channel of TV receiver 34 is set to a predetermined prescribed video channel, CATV distributing device 10 sends video information through the set video channel.

Figure 4:
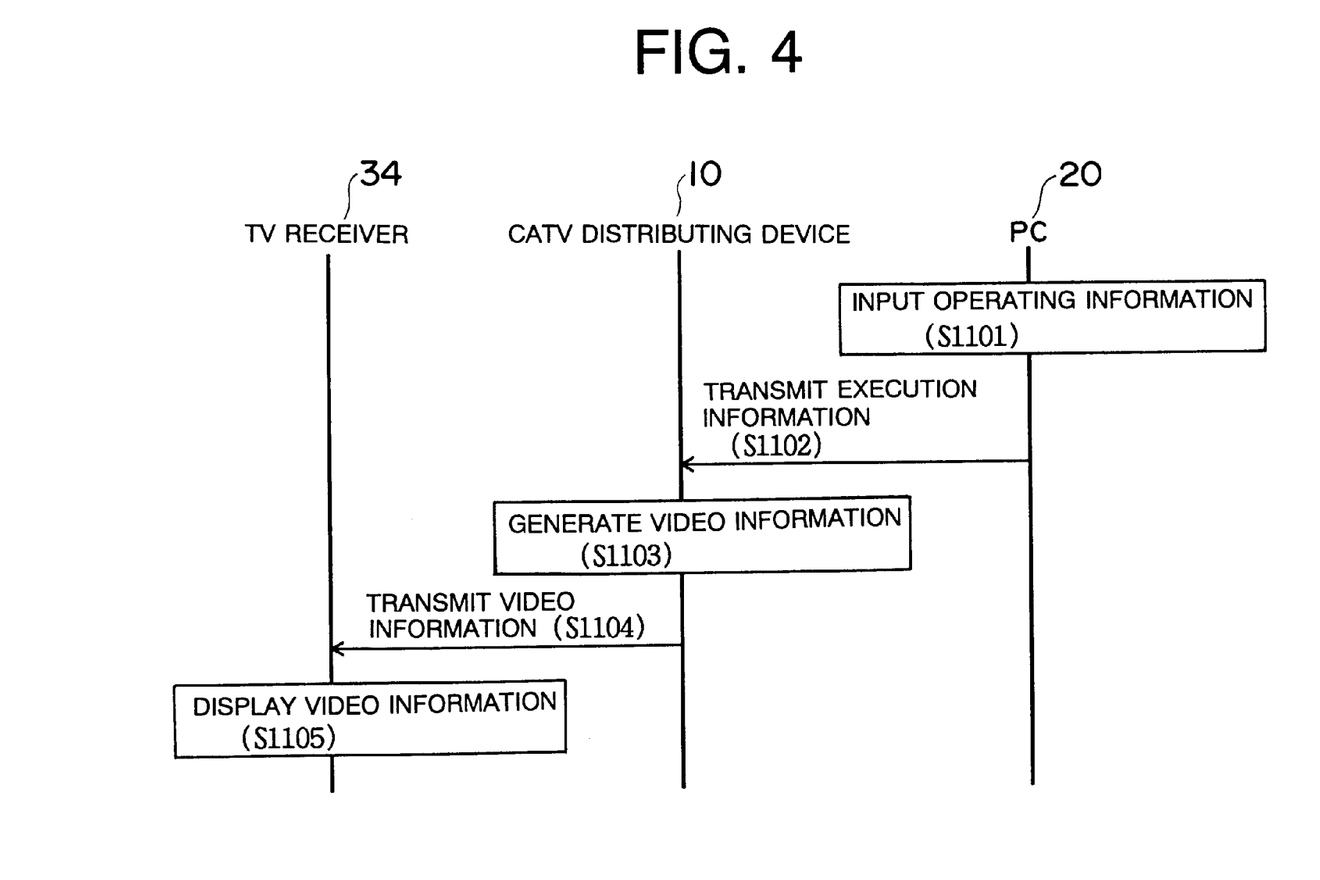
FIG. 4 is an operating sequence diagram of a first embodiment of the present invention.

FIG. 4 is an operating sequence diagram of a first embodiment. The operation of the first embodiment will be described using FIG. 4. Let us assume that video information generating unit 12D holds software whereby a racing car runs around a circuit. Let us further assume that a subscriber of the bidirectional CATV system possesses a PC 20 and TV receiver 34. And let us assume that TV receiver 34 displays the video information transmitted from CATV distributing device 10 through the prescribed video channel.

First of all, referring to the video information displayed on TV receiver 34, the subscriber inputs to execution information compilation unit 27 operating information (e.g. position information, direction information and speed information) through an operating information input unit 28 of the PC 20. When this is done, execution information compiling unit 27 compiles execution information (added information) in accordance with this input operating information (step 1101). Next, the added information constituted by the execution information compiled in step 1101 is transmitted to second communication unit 11 of CATV distributing device 10 from first communication unit 21 of PC 20 through a control channel (step 1102). When the execution information is transmitted, it has the identification number of the subscriber appended to it.

Next, if the added information which it receives is execution information, second communication unit 11 of CATV distributing device 10 sends this execution information to video information generating unit 12D. Video information generating unit 12D then changes the execution condition of the software in response to the position, direction and speed designated by the execution information and generates video information corresponding to the execution condition (step 1103).

More specifically, video information generating unit 12D generates video information of the racing car running around the circuit in response to the input position information, direction information and speed information.

Second communication unit 11 then sends the generated video information through the prescribed video channel to the TV receiver 34 of the subscriber corresponding to the identification number contained in the added information (step 1104).

Figure 5:
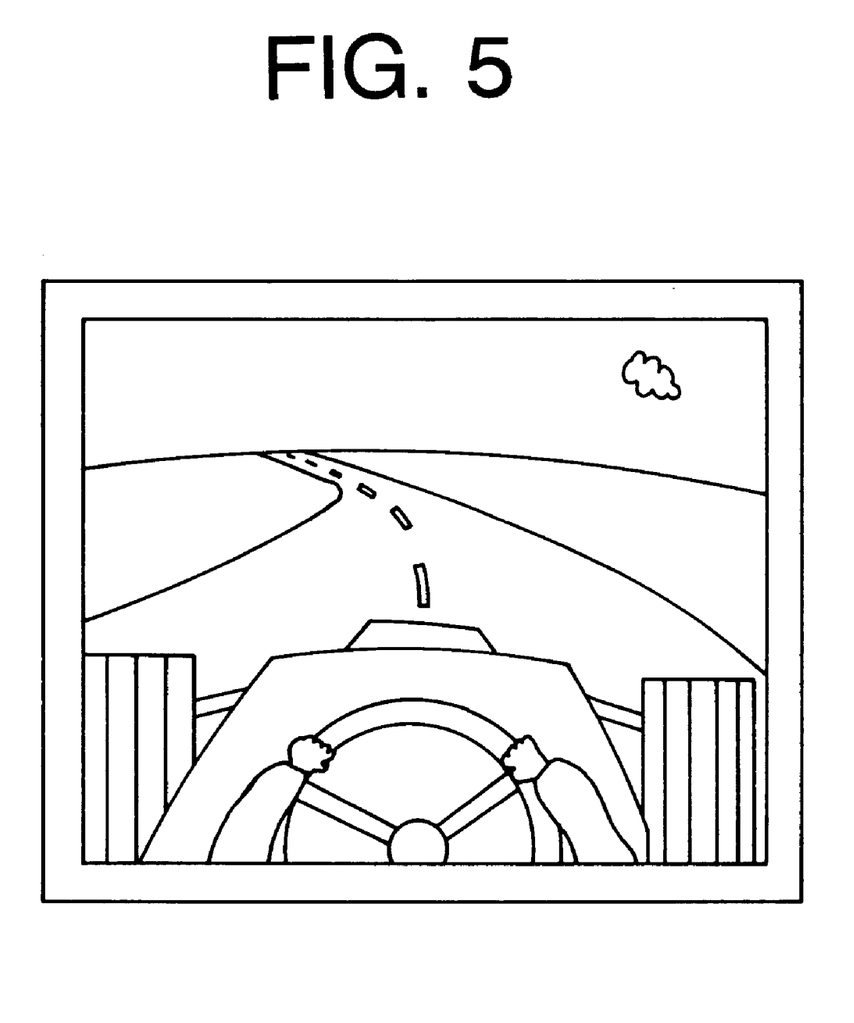
FIG. 5 is an example of the screen display of a TV receiver of the first embodiment of the present invention.

When this happens, TV receiver 34 displays the video information corresponding to the execution information (step 1105). FIG. 5 is an example of the screen display of a TV receiver of this first embodiment. This Figure is an example of the display of video information of a racing car running around a circuit in response to input execution information.

Thus, when the series of processes from step 1101 to step 1105 have been performed, the subscriber is able to freely run the software held on CATV distributing device 10 using PC 20. Furthermore, complex information exchange can be performed bidirectionally between the subscriber's PC 20 and CATV distributing device 10.

Second embodiment

Figure 6:
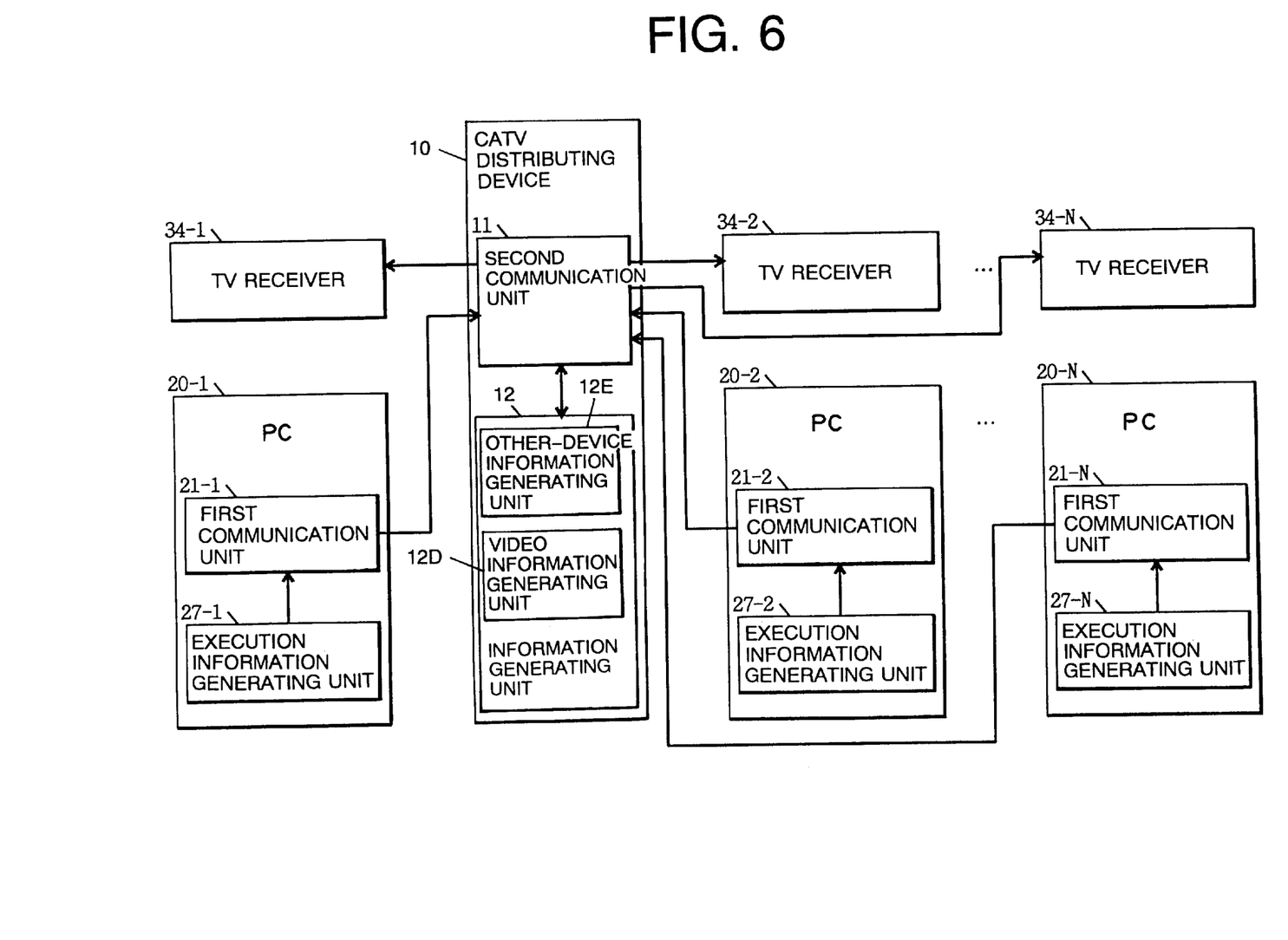
FIG. 6 is a block diagram of a bidirectional CATV system layout according to a second embodiment of the present invention.

FIG. 6 is a block diagram of the layout of a bidirectional CATV system according to a second embodiment of the present invention. The bidirectional CATV system is equipped with CATV distributing device 10, TV receivers 34-1 to 34-N provided for each of a plurality of subscribers, and processing terminal devices (PCs) 20-1 to 20-N.

PCs 20-1 to 20-N are personal computers. These PCs (20-1 to 20-N) are provided with execution information compiling units 27-1 to 27-N and first communication units 21-1 to 21-N. The execution information compiling units 27-1 to 27-N compile the execution information used to execute the software contained in the information generating unit 12 of the CATV distributing device 10. First communication units 21-1 to 21-N send execution information compiled by execution information compilation units 27-1 to 27-N to CATV distributing device 10 as added information.

CATV distributing device 10 is provided with second communication unit 11 and information generating unit 12.

Information generating unit 12 is constituted by video information generating unit 12D and other-device information generating unit 12E. Other-device information generating unit 12E stores the execution information for each subscriber and transmits stored execution information to second communication unit 11 and video information generating unit 12D. Video information generating unit 12D holds the prescribed software and generates video information by executing this software. Also, video information generating unit 12D reads the execution information for each subscriber from other-device information generating unit 12E and changes the execution condition of the software in response to the execution information of each of these subscribers individually. Furthermore, on the basis of this software execution condition, video information generating unit 12D changes the video information to video information responsive to the execution information of each subscriber.

Second communication unit 11 sends the video information that is generated to the TV receiver 34 corresponding to each subscriber. Also, second communication unit 11 receives added information from PCs 20-1 to 20-N. If the added information that it receives is execution information, second communication unit 11 sends this execution information to other-device information generating unit 12E. Also, second communication unit 11 sends the video information of each subscriber generated by video information generating unit 12D to the corresponding TV receiver 34, respectively. Second communication unit 11 is also capable of sending the execution information of each subscriber, which is stored in other-device information generating unit 12E, to PCs 20-1 to 20-N.

Third Embodiment

Figure 7:
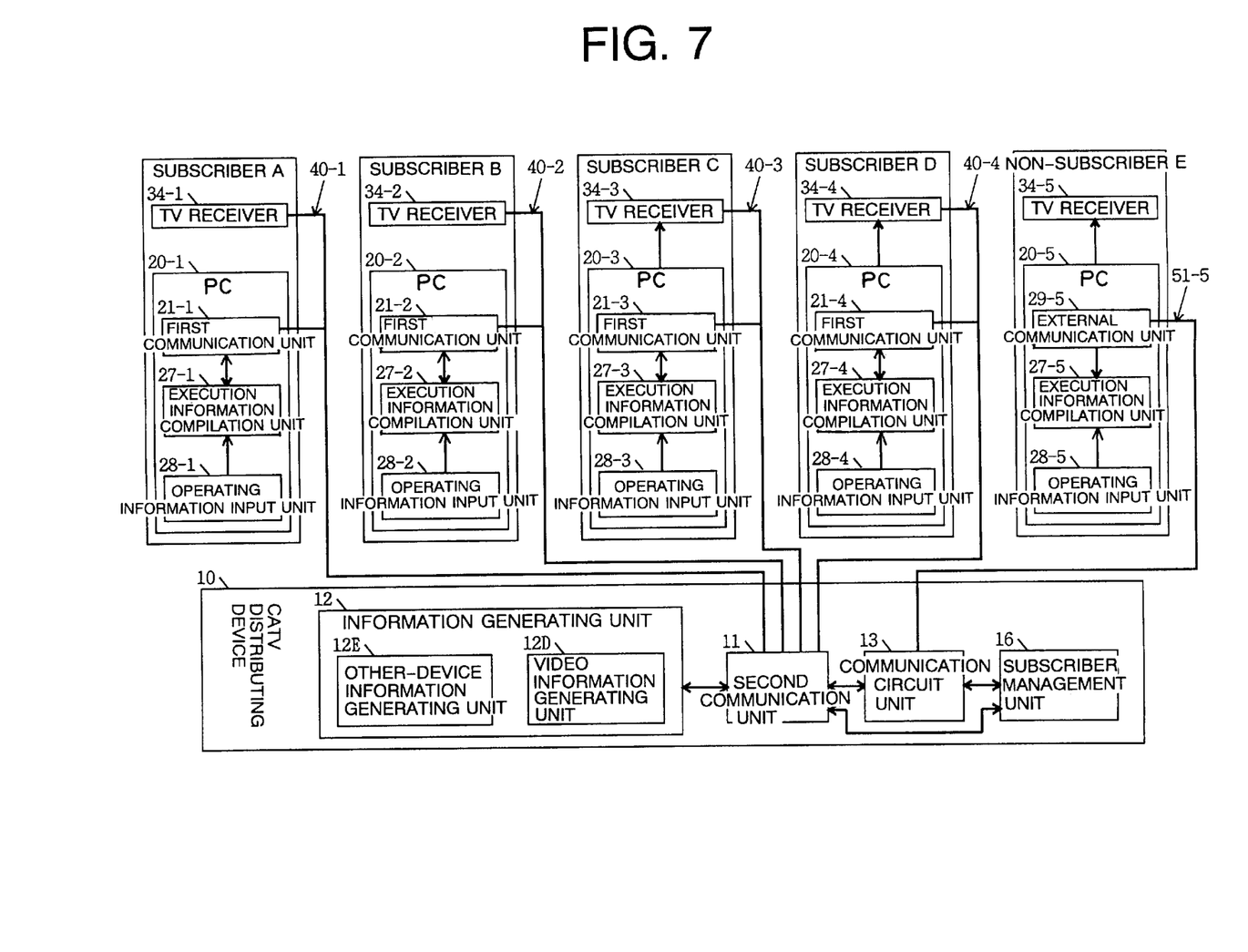
FIG. 7 is a block diagram of a bidirectional CATV system layout according to a third embodiment of the present invention.

FIG. 7 is a block diagram of the layout of a bidirectional CATV system according to a third embodiment. The third embodiment is an embodiment in which a construction is added whereby the subscriber and CATV distributing device are connected through a communication circuit.

In this Figure, CATV distributing device 10 is constituted of a second communication unit 11, information generating unit 12, circuit communication unit 13, and subscriber management unit 16. Circuit communication unit 13 and subscriber management unit 16 are connected to second communication unit 11. Subscriber management unit 16 manages whether the party that has issued the added information is a CATV subscriber or non-subscriber, using for this purpose a list of previously registered subscribers. Subscriber management unit 16 also stores and manages for each subscriber the condition of participation in the subscriber game (for example, participation or spectating).

Information generating unit 12 is constituted of video information generating unit 12D and other-device information generating unit 12E. If the added information received by second communication unit 11 or circuit communication unit 13 is execution information, other-device information generating unit 12E stores this execution information, for each subscriber. Other-device information generating unit 12E sends the stored execution information to second communication unit 11 and video information generating unit 12D. Video information generating unit 12D holds prescribed software and generates video information by executing this software. Also, video information generating unit 12D reads the execution information for each subscriber from other-device information generating unit 12E and changes the execution condition of the software in response to the execution information of each subscriber. Furthermore, on the basis of this software execution condition, video information generating unit 12D changes the video information in response to the execution information of each subscriber. Subscribers A to D and non-subscriber E are respectively provided with PCs 20-1 to 20-5 and TV receivers 34-1 to 34-5. PCs 20-1 to 20-4 of subscribers A to D are respectively provided with first communication units 21-1 to 21-4, execution information generating units 27-1 to 27-4, and operating information input units 28-1 to 28-4. Also, PC 20-5 of non-subscriber E is provided with an external communication unit 29-5 that transmits and receives added information, an execution information compilation unit 27-5, and an operating information input unit 28-5. The function of the execution information compilation unit 27-5 and operating information input unit 28-5 of PC 20-5 of non-subscriber E is the same as that of execution information compilation units 27-1 to 27-4 and operating information input units 28-1 to 28-4 of PCs 20-1 to 20-4 of subscribers A to D.

Also, PCs 20-1 to 20-4 of subscribers A to D are respectively connected to CATV distributing device 10 through optical fiber cables (optical cables) 40-1 to 40-4. Also, PC 20-5 of non-subscriber E is connected to circuit communication unit 13 of CATV distributing device 10 through a communication circuit (for example, an ISDN circuit) 51-5.

CATV distributing device 10 is connected through optical cables 40-1 to 40-4 with the TV receivers 34-1 to 34-4 of respective subscribers A to D. However, the TV receiver 34-5 of non-subscriber E is not connected to CATV distributing device 10. TV receiver 34-5 of non-subscriber E therefore cannot display the video information transmitted from CATV distributing device 10.

First communication units 21-1 to 21-4 of PCs 20-1 to 20-4 transmit added information through the control channels that are allocated in the CATV broadcast band whereby the video information is transmitted. Also, second communication unit 11 of CATV distributing device 10 receives added information through the control channels. Second communication unit 11 is also capable of sending the execution information of each subscriber stored in other-device information generating unit 12E to PCs 20-1 to 20-2. External communication unit 29-5 of non-subscriber E sends added information to circuit communication unit 13 of CATV distributing device 10 through a communications circuit. Also, like second communication unit 11, circuit communication unit 13 is capable of sending execution information of each subscriber stored in other-device information generating unit 12E through communication circuit 51-5 to external communication unit 29-5 of non-subscriber E.

Second communication unit 11 of CATV distributing device 10 sends the video information from information generating unit 12 through a predetermined prescribed video channel. That is, if the TV receivers 34-1 to 34-4 of subscribers A to D are set to the predetermined prescribed video channel, CATV distributing device 10 can send video information through this set video channel.

TV receivers 34-1 to 34-4 of subscribers A to D display the video information that is sent from CATV distributing device 10. In contrast, TV receiver 34-5 of non-subscriber E displays added information sent from CATV distributing device 10 (for example, execution information) through PC 20-5 in the form of letter information.

The operation of the third embodiment will now be described. Let us assume that video information generating unit 12D holds race-type game software whereby a racing car runs around a circuit. Also, let us assume that TV receivers 34-1 to 34-4 display the video information sent through the prescribed video channel from CATV distributing device 10.

Figure 8:
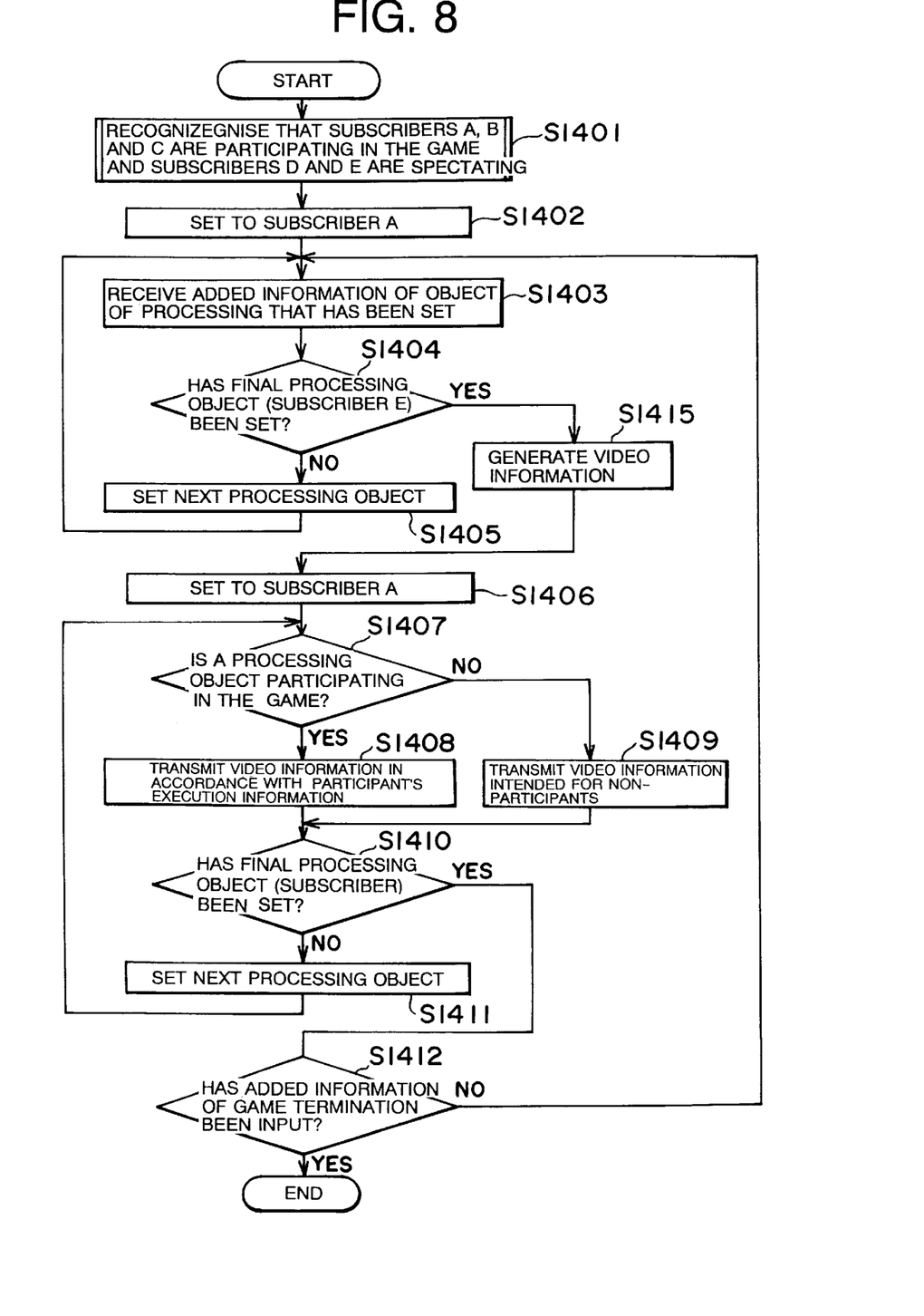
FIG. 8 is a flow chart showing the processing that is executed by the CATV distributing device according to the third embodiment of the present invention.

FIG. 8 is a flow chart showing the processing that is executed by CATV distributing device of the third embodiment.

Figure 9:
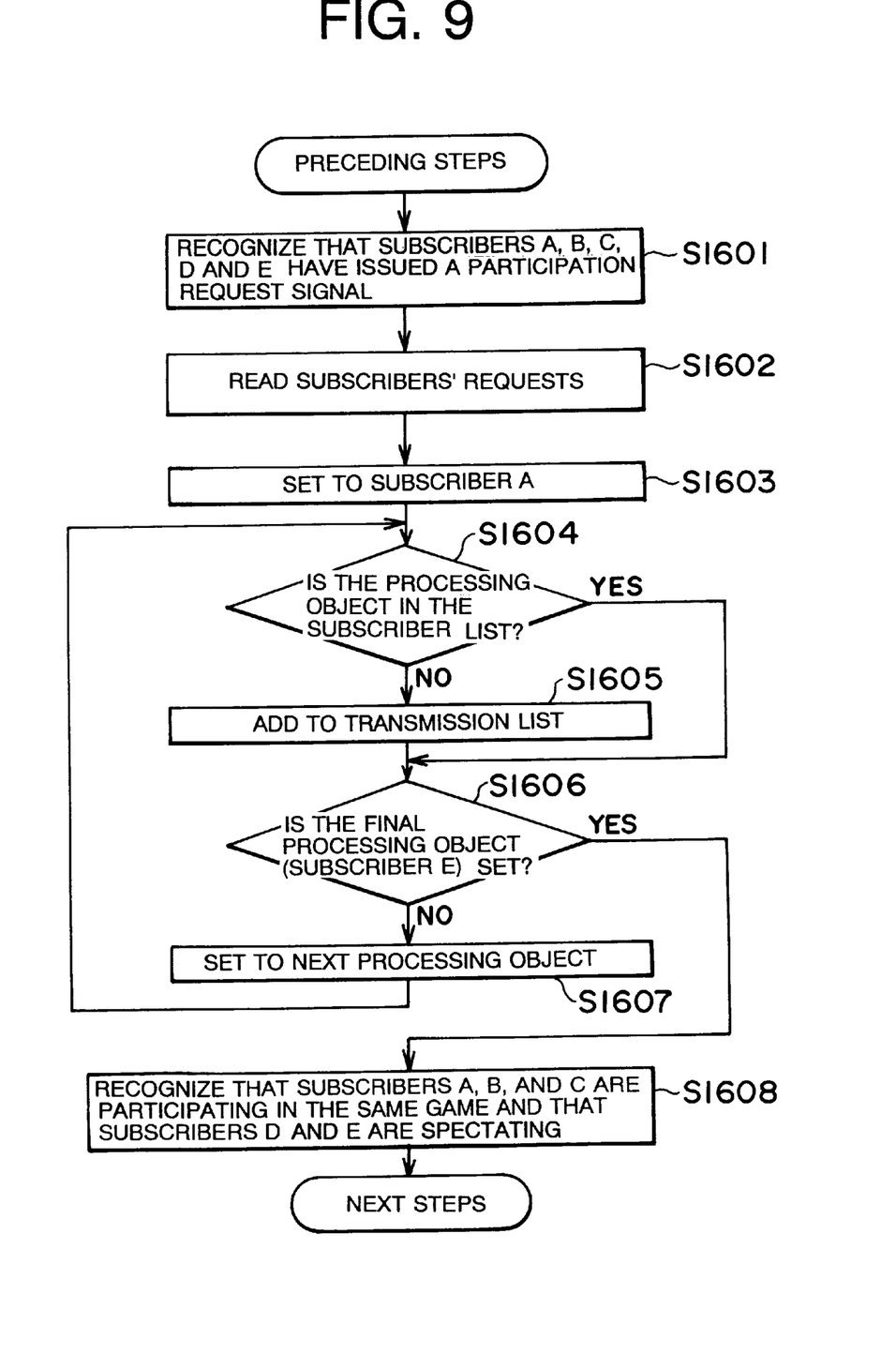
FIG. 9 is a flow chart of the processing whereby a decision is made as to whether the subscriber is to be a participant or a spectator in a game of the present invention.

When processing starts, subscriber management unit 16, by referring to the added signals received by second communication unit 11 and circuit communication unit 13, recognizes who is participating in the same game, who is not participating (spectating) and who is a non-subscriber (step 1401). FIG. 9 is a flow chart of the participant recognition processing of step 1401. The participant recognition processing will now be described with reference to FIG. 9. Let us assume that a request signal (added information) to request participation has already been received from PCs 20-1 to 20-3 of subscribers A to C and that a request signal (added information) specifying non-participation (spectating) has already been output from PC 20-4 of subscriber D and PC 20-5 of subscriber E.

First of all, subscriber management unit 16 recognizes (step 1601) that request signals are being output from PCs 20-1 to 20-4 of subscribers A to D or from PC 20-5 of non-subscriber E, through second communication unit 11 and circuit communication unit 13. Accordingly, subscriber management unit 16 reads the previously registered CATV subscriber list (step 1602).

Subscriber management unit 16 processes the processing objects from subscriber A in sequence as B, C, D, E. Subscriber processing unit 16 sets subscriber A as a processing object (step 1603).

Subscriber management unit 16 ascertains whether or not the set processing subject is registered in the subscriber list (step 1604).

If in step 1604 the result "YES" is obtained i.e. if it is ascertained that the set processing subject is in fact registered in the subscriber list, processing advances to step 1606.

If in step 1604 the result is "NO" (for example, if it is ascertained that subscriber E is not in the subscriber list), subscriber management unit 16 adds processing object (subscriber E) to the transmission list for sending execution information of each subscriber, which is stored in other-device information generating unit 12E (step 1605).

Next, subscriber processing unit 16 ascertains whether or not subscriber E (the last processing object) is set (step 1606).

If in step 1606 the result is "YES", i.e. if it is ascertained that subscriber E is set, processing advances to step 1608.

If in step 1606 the result is "NO", i.e. if it is ascertained that subscriber E is not set, subscriber management unit 16 sets the next subscriber (e.g. subscriber B) (step 1607). After the processing of step 1607, processing returns to step 1604.

In step 1608, subscriber management unit 16 for example recognizes subscribers A, C and B as all participants in the game and recognizes subscriber D and non-subscriber E as both non-participants (spectators).

In addition, subscriber management unit 16 recognizes that non-subscriber E has been added to the transmission list for sending execution information of each subscriber. After the processing of step 1608, processing advances to step 1402 of FIG. 8.

Subscriber management unit 16 sets subscriber A as reception processing object of added information (step 1402).

Second communication unit 11 then receives added information of the reception processing object that has been set from for example PC 20-1 (step 1403). If the received added information is execution information, second communication unit 11 sends this execution information to other-device information generating unit 12E. Other-device information generating unit 12E stores this execution information for each reception processing object.

Subscriber management unit 16 then ascertains whether or not non-subscriber E has been set as a reception processing object (step 1404).

If in step 1404, the result is "YES", i.e. if it is ascertained that non-subscriber E has been set, processing advances to step 1415.

On the other hand, if in step 1404 the result is "NO", i.e. if it is ascertained that non-subscriber E has not been set, the next reception processing object (for example, subscriber B) is set (step 1405). After execution of step 1405, processing returns to step 1403.

When the loop of steps 1403 to 1405 has been repeated for all the reception processing objects, the execution information of all the participants A to C will have been collected in other-device information generating unit 12E.

The execution information that has been collected is sent from other-device information generating unit 12E to video information generating unit 12D. Using the execution information of participants A to C, video information generating unit 12D executes the software and generates condition information in which the conditions of the racing cars of the respective participants are mutually combined. Also, based on the condition information obtained by mutually combining the conditions of the racing cars of the different participants, video information generating unit 12D generates video information as seen from the viewpoint of the racing cars of the respective participants A to C and as seen from the viewpoint of spectator D, respectively (step 1415).

Subscriber management unit 16 sets subscriber A as a video information transmission processing object (step 1406).

Next, subscriber management unit 16 ascertains (step 1407), based on the recognition performed in step 1401, whether or not the transmission processing object is participating in the game.

If in step 1407 the result is "YES", i.e. if the processing object is ascertained to be a participant, second communication unit 11, using the transmission list, sends video information from the point of view of the racing car of this participant to the TV receiver of this participant (step 1408).

In step 1407, if the result is "NO", i.e. if the object is ascertained to be not a participant but a spectator, second communication unit 11 sends video information seen from the viewpoint of the spectator to the TV receiver of the spectator. And if the object is a non-subscriber, circuit communication unit 13 sends the execution information of each subscriber, which is stored in other-device information generating unit 12E, to the PC 20-5 of the non-subscriber E (step 1409).

After the processing of step 1408 or step 1409, subscriber management unit 16 ascertains (step 1410) whether or not non-subscriber E is set as an object of transmission processing.

If in step 1410 the result is "NO", i.e. it is ascertained that non-subscriber E is not set, the next transmission processing object (for example subscriber B) is set (step 1411). After execution of step 1411, processing returns to step 1407. When the loop of steps 1407 to 1411 has been repeated for all the persons who are transmission processing objects, second communication unit 11 terminates transmission of video information to all the subscribers A to D.

If in step 1410 the result is "YES", CATV distributing device 10 ascertains (step 1412) whether or not added information giving notification of game termination has been input from all the participants to second communication unit 11 or communication circuit unit 13.

If in step 1412 the result is "YES", i.e. if added information to the effect that the game has been terminated has been input from all participants, processing is terminated.

If in step 1412 the result is "NO", i.e. if added information to the effect that the game has been terminated has not been input from all participants, processing returns to step 1403, and execution of the steps mentioned above is repeated.

Figure 10:
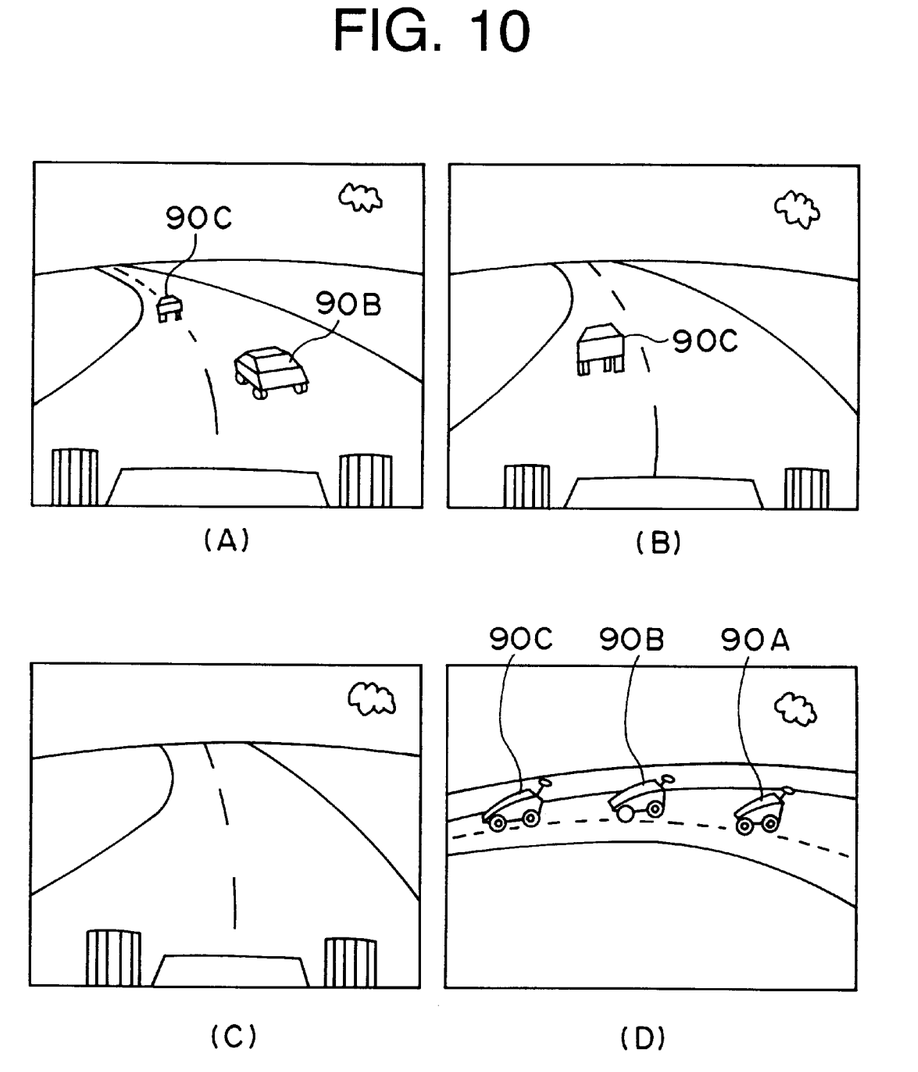
FIGS. 10(A)–10(D) are examples of the screen display of a TV receiver of the subscriber in the third embodiment of the present invention.

FIG. 10 is an example screen display of a TV receiver according to the third embodiment. FIG. 10 shows the case where the processing of FIG. 8 is in progress and the order of the participants in the race is: C, B, A. FIG. 10(A) is an example display of TV receiver 34-1 of subscriber A. In FIG. 10(A) video information is displayed depicting lead racing car 90C of subscriber C and racing car 90B of subscriber B, which is following it. FIG. 10(B) is an example display of TV receiver 34-2 of subscriber B. FIG. 10(B) is an example display of TV receiver 34-2 of subscriber B. In FIG. 10(B) the video information depicting lead racing car 90C of subscriber C is displayed. FIG. 10(C) is an example display of the TV receiver 34-3 of subscriber C. In FIG. 10(C) video information seen from the viewpoint of the racing car of subscriber C is displayed. FIG. 10(D) is an example display of TV receiver 34-4 of subscriber D. In FIG. 10(D) video information is displayed depicting the running of racing car 90C of subscriber C, racing car 90B of subscriber B and racing car 90A of subscriber A from the viewpoint of spectator D.

Fourth Embodiment

Figure 11:
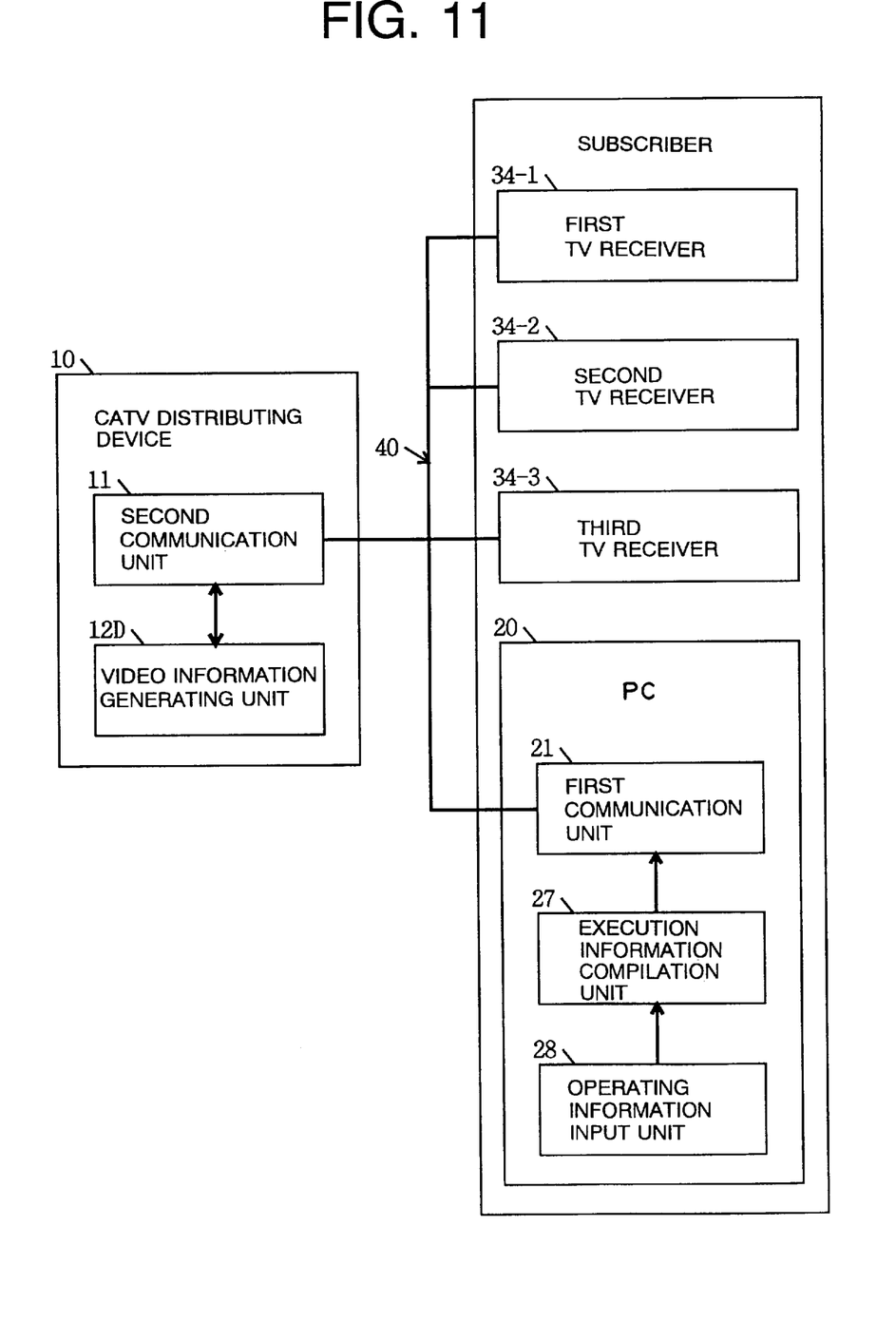
FIG. 11 is a block diagram of a bidirectional CATV system layout according to a fourth embodiment of the present invention.

FIG. 11 is a block diagram of the layout of a bidirectional CATV system according to a fourth embodiment.

The bidirectional CATV system of the fourth embodiment is equipped with a CATV distributing device 10 that sends video information and that receives added information, a plurality of TV receivers 34-1 to 34-3 that display video information transmitted from CATV distributing device 10, and a processing terminal device (PC) 20 that transmits added information to CATV distributing device 10.

CATV distributing device 10 is provided with a video information generating unit 12D and second communication unit 11. Video information generating unit 12D holds prescribed software and executes this software. For example, video information generating unit 12D holds software whereby video information is generated based on input viewpoint information if a subscriber inputs as execution information viewpoint information such as "right", "left", "front", or "back".

Second communication unit 11 receives added information from PC 20. If the added information received by second communication unit 11 is execution information, it sends this execution information to video information generating unit 12D. Second communication unit 11 sends the video information generated by video information generating unit 12D to each TV receiver 34-1 to 34-N.

TV receivers 34-1 to 34-N display this video information that is sent from CATV device 10. 40 is an optical fiber cable (optical cable). Optical cable 40 connects CATV distributing device 10, PC 20 and three TV receivers 34-1 to 34-3 belonging to a subscriber. Video information generated by video information generating unit 12D is transmitted through optical cable 40 from second communication unit 11 to each of a plurality of TV receivers 34-1 to 34-N.

PC 20 is a personal computer. This PC 20 is provided with an execution information compiling unit 27, first communication unit 21 and operating information input unit 28. The subscriber inputs operating information to execution information compilation unit 27 using operating information input unit 28. Execution information compilation unit 27 uses this operating information to compile execution information employed in execution of the software held by video information generating unit 12D. First communication unit 21 sends the execution information compiled by execution information compilation unit 27 to CATV distributing device 10 as added information.

Figure 12:
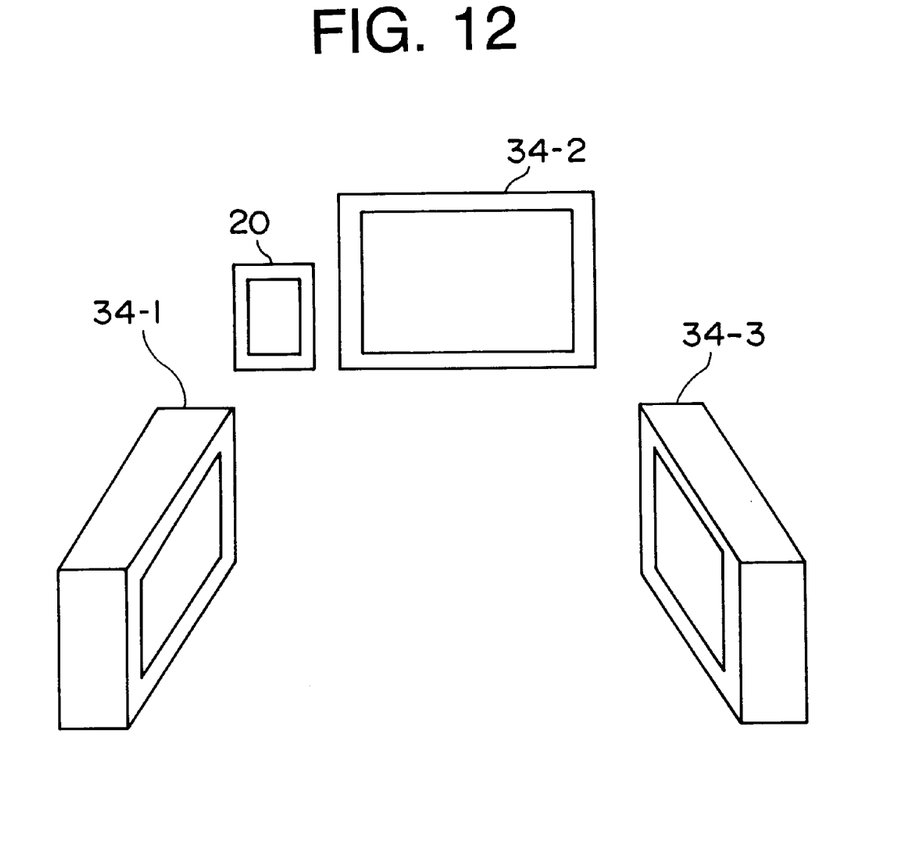
FIG. 12 is a perspective view of a PC and TV receiver according to a fourth embodiment.

FIG. 12 shows the arrangement of the PC 20 and the three TV receivers 34-1 to 34-3 possessed by a subscriber. In more detail, first TV receiver 34-1 is located to the left, seen from the subscriber. Second TV receiver 34-2 is located at the front, seen from the subscriber. Third TV receiver 34-3 is located on the right, seen from the subscriber. PC 20 is arranged on the left side of second TV receiver 34-2. However, if required, PC 20 could be arranged in any desired position.

This second communication unit 11 and first communication unit 21 of PC 20 can exchange added information through a control channel that is allocated in the band whereby the video information is transmitted. In this case, the control channel is allocated in the same way as in the case of the first embodiment. It should be noted that it is assumed that PC 20 and the three TV receivers 34-1 to 34-3 are possessed by the same subscriber to the bidirectional CATV system.

Also, the number of TV receivers is not restricted to three and could be two or four or more.

Figure 13:
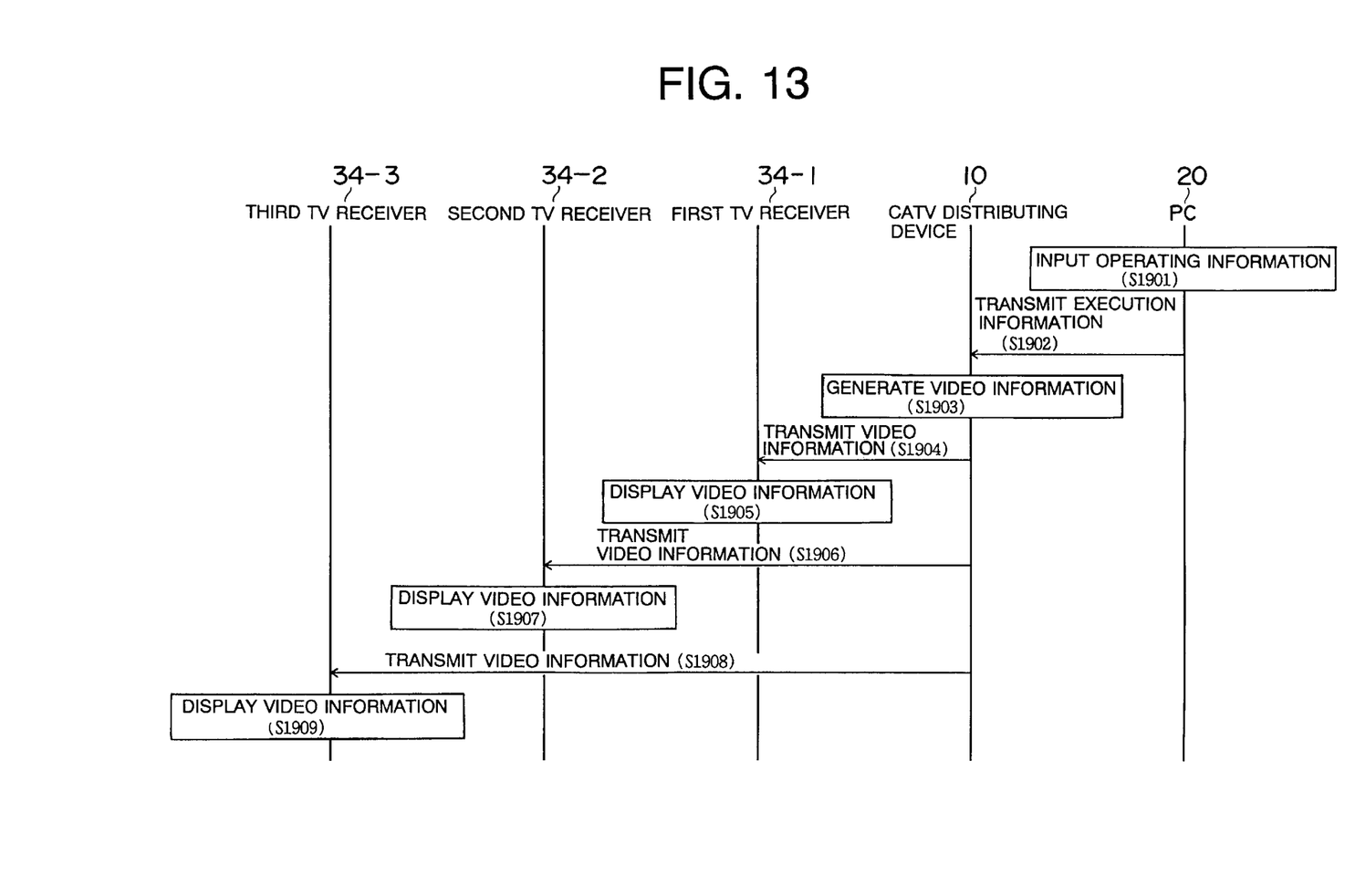
FIG. 13 is an operating sequence diagram of a fourth embodiment of the present invention.

FIG. 13 is a diagram showing the operating sequence of a fourth embodiment. The operating sequence of the fourth embodiment will be described with reference to this Figure.

First of all, using operating information input unit 28 of PC 20, the subscriber inputs the operating information (for example, viewpoint information "left" of first TV receiver 34-1, viewpoint information "front" of second TV receiver 34-2 and viewpoint information "right" of third TV receiver 34-3). When this is done, execution information compilation unit 27 uses this input operating information to compile execution information (added information) (step 1901).

Next, the execution information compiled in step 1901 is transmitted as added information from first communication unit 21 of PC 20 to the second communication unit 11 of CATV distributing device 10, through a control channel (step 1902). This execution information has the identification number of each TV receiver appended to it on transmission.

Next, if the added information that it receives is execution information, second communication unit 11 sends this execution information to video information generating unit 12D. After this, video information generating unit 12D generates video information for each viewpoint of TV receivers 34-1 to 34-3 that were input, by executing the software using the viewpoint information of the TV receivers designated by the execution information (step 1903). Specifically, using the viewpoint information of first TV receiver 34-1, left-side video information is generated. Also, using the viewpoint information of the second TV receiver 34-2, front video information is generated. And, using the viewpoint information of third TV receiver 34-3, right-side video information is generated.

Next, the left-side video information generated in step 1903 is sent to first TV receiver 34-1 from second transmission unit 11 (step 1904).

The left-side video information sent in step 1904 is then displayed on first TV receiver 34-1 (step 1905).

Next, the front video information generated in step 1903 is sent from second transmission unit 11 to second TV receiver 34-2 (step 1906).

The front video information that was transmitted in step 1906 is then displayed on second TV receiver 34-2 (step 1907).

Next, the right-side video information generated in step 1903 is transmitted to third TV receiver 34-3 from second transmission unit 11 (step 1908).

The right-side video information that was sent in step 1908 is then displayed on third TV receiver 34-3 (step 1908).

The series of processes from the above step 1901 to step 1909 continue to be performed as long as video information generating unit 12D is executing the software.

With the bidirectional CATV system of the present invention, the CATV distributing device can generate video information responsive to many types of added information from the subscribers and can transmit this to the TV receivers of the subscribers. Consequently, the range of services provided by the CATV distributing device is expanded.

It is apparent that, in this invention, a wide range of different working modes can be formed based on the invention without deviation from the spirit and scope of the invention. This invention is not restricted by its specific working modes except being limited by the appended claims.

What is claimed is:

1. A bidirectional CATV system comprising a CATV distributing device and a plurality of terminal systems,
said CATV distributing device further comprising:
a video information generating unit that simultaneously generates a plurality of video information pieces by executing one game program using a plurality of execution information pieces individually transmitted from each terminal system over a digital control channel allocated in a CATV broadcast band, each piece of the plurality of video information pieces arranged for each terminal system individually and showing a picture as if viewed from a virtual position of the terminal in the game corresponding to its execution information; and
a communication unit that receives the execution information from said terminal systems, sends the execution information to the video information generating unit, and sends each piece of the video information to corresponding terminal system individually over an analog video information channel in the CATV broadcast band,
each terminal system further comprising:
at least one TV receiver that displays the picture based on the video information sent from the CATV distributing device;
a processing device having an execution information compilation unit that compiles the execution information by entering the game program; and
a communication unit that transmits the execution information to the CATV distributing device over the digital control channel allocated in the CATV broadcast band, whereby a plurality of users may play the game program against each other and view the game program from their own perspective in the game program.

2. A bidirectional CATV system according to claim 1, wherein
said CATV distributing device is connected to one of the terminal systems through communication circuit each other,
said CATV distributing device is provided with a circuit communication unit that receives the execution information from the processing device of the terminal system through the communication circuit, and
said video information generating unit generates the video information by executing the software using the execution information.

3. A bidirectional CATV system comprising a CATV distributing device and a terminal system,
said terminal system further comprising:
a plurality of TV receivers each displaying a picture based on individual video information sent from the CATV distributing device;
a processing device having an execution information compilation unit that compiles execution information; and
a communication unit that transmits the execution information to the CATV distributing device, and
said CATV distributing device further comprising:
a video information generating unit that simultaneously generates a plurality of video information pieces by executing one game program using the execution information transmitted from the terminal system, each of the plurality of video information pieces arranged for each TV receiver individually and showing a picture as if viewed from a virtual direction of the terminal system toward a virtual direction of the TV receiver in the game corresponding to the execution information; and
a communication unit that receives the execution information from said terminal systems, sending the execution information to the video information generating unit, and sends said plurality of video information pieces to said TV receivers individually, whereby a plurality of users may play the game program against each other and view the game program from their own perspective in the game program.

4. A CATV distributing device, which is connected to a plurality of terminal systems each having a TV receiver that displays video information and a processing device that transmits execution information to the CATV distributing device, comprising:

a video information generating unit that simultaneously generates a plurality of video information pieces by executing one game program using a plurality of execution information pieces individually transmitted from each terminal system, each piece of the video information arranged for each terminal system individually and showing a picture as if viewed from a virtual position of the terminal in the game corresponding to its execution information; and a communication unit that receives the plurality of execution information pieces from said terminal systems, sends this execution information to the video information generating unit, and sends each piece of the plurality of video information pieces to corresponding terminal system individually, whereby a plurality of users may play the game program against each other and view the game program from their own perspective in the game program.

5. A CATV distributing device according to claim 4, wherein said CATV distributing device is connected to one of the terminal systems through a communications circuit, said CATV distributing device is provided with a circuit communication unit that receives the execution information from the terminal system through the communication circuit, and said video information generating unit generates the video information by executing the software using the execution information.

6. A CATV distributing device, which is connected to a terminal system having a plurality of TV receivers that display video information, and a processing device that transmits execution information to the CATV distributing device, comprising:

a video information generating unit that simultaneously generates a plurality of video information pieces by executing one game program using the execution information transmitted from the terminal system, each of the plurality of video information pieces arranged for each TV receiver individually and showing a picture as if viewed from a virtual direction of the terminal system toward a virtual direction of the TV receiver in the game corresponding to the execution information; and a communication unit that receives the execution information from said terminal system, sends this execution information to the video information generating unit, and sends said plurality of video information pieces to the TV receivers individually, whereby a plurality of users may play the game program against each other and view the game program from their own perspective in the game program.

7. A cable television bidirectional communication system comprising a terminal system and a distributing device, wherein:

said terminal system further comprises a plurality of individual user systems, each user system further comprising;

at least one TV receiver displaying a picture based on video information sent from the distributing device over multiple analog video information channels of a cable television broadcast band;

a processing device having an execution information compilation unit that compiles execution information by entering a game program; and a communication unit that transmits execution information to the distributing device over a digital control channel allocated in the cable television broadcast band; and said distributing device further comprises;

a video information generating unit that simultaneously generates a plurality of video information pieces by executing one game program using a plurality of execution information pieces transmitted from each individual user system, each piece of the plurality of video information pieces individually arranged for each of the plurality of user systems and showing a picture as if viewed from a virtual position of the terminal in the game corresponding to the individual user system execution information thereby allowing a plurality of users to play the game program against each other and view the game program from their own perspective in the game program; and a communication unit that receives the execution information from individual user systems, inputs the execution information to the video information generating unit, and sends the plurality of video information pieces from the video information generating unit to corresponding individual user systems over an analog video information channel in the cable television broadcast band.

* * * * *